(12) United States Patent
Hirvi (10) Patent No.: US 11,463,910 B2
(45) Date of Patent: Oct. 4, 2022

(54) LOAD BALANCING SOLUTION FOR CO-OPERATIVE BROADCASTING IN A WIRELESS COMMUNICATION SYSTEM

(71) Applicant: WIREPAS OY, Tampere (FI)

(72) Inventor: Hannu Hirvi, Tampere (FI)

(73) Assignee: WIREPAS OY, Tampere (FI)

(*) Notice: Subject to any disclaimer, the term of this patent is extended or adjusted under 35 U.S.C. 154(b) by 120 days.

(21) Appl. No.: 17/159,192

(22) Filed: Jan. 27, 2021

(65) Prior Publication Data
US 2021/0235320 A1    Jul. 29, 2021

(30) Foreign Application Priority Data

Jan. 27, 2020 (FI) .................................. 20205077

(51) Int. Cl.
*H04W 28/08* (2009.01)
*H04L 1/18* (2006.01)

(52) U.S. Cl.
CPC ........... *H04W 28/08* (2013.01); *H04L 1/1816* (2013.01)

(58) Field of Classification Search
None
See application file for complete search history.

(56) References Cited

U.S. PATENT DOCUMENTS

| | | | | |
|---|---|---|---|---|
| 6,580,715 | B1* | 6/2003 | Bare | H04L 47/125 370/255 |
| 8,064,363 | B2 | 11/2011 | Kohvakka et al. | |
| 10,999,193 | B1* | 5/2021 | Lapukhov | H04L 45/48 |
| 2003/0179707 | A1* | 9/2003 | Bare | H04L 12/185 370/252 |
| 2015/0189009 | A1* | 7/2015 | van Bemmel | H04L 67/1008 709/226 |
| 2018/0146425 | A1 | 5/2018 | Lee et al. | |
| 2018/0242266 | A1 | 8/2018 | Xhafa et al. | |

(Continued)

FOREIGN PATENT DOCUMENTS

EP          3509248 A1    7/2019

*Primary Examiner* — Warner Wong
(74) *Attorney, Agent, or Firm* — Thomas | Horstemeyer, LLP (57) ABSTRACT

The invention relates to a wireless communication system comprising a plurality of radio devices. Each radio device belongs to one or more radio neighborhoods and is capable of repeating the transmission of the broadcast message regardless of whether the radio device is operating as a router device or as a non-router device. The radio devices belonging to each radio neighborhood are configured to repeat collectively a transmission of a broadcast message a collective target amount of repetitions within each radio neighborhood. Each radio device within each radio neighborhood to which it belongs is arranged to: define a total repetition load value representing a contribution of said radio device to the collective target amount of repetitions of the broadcast message within said radio neighborhood, and decide whether to repeat the transmission of the broadcast message in accordance with the defined total repetition load value. The invention relates also to a method for the wireless communication system, a radio device for the wireless communication system, a method for the radio device, a computer program, and a tangible non-volatile computer readable medium.

15 Claims, 3 Drawing Sheets

(56) References Cited

U.S. PATENT DOCUMENTS

2019/0149460 A1* 5/2019 Andrews ................. H04L 45/24
                                                              370/390
2021/0126968 A1* 4/2021 Westrick, Jr. ....... H04L 67/1068
2022/0086687 A1* 3/2022 Sakoda ................... H04W 4/06

* cited by examiner

LOAD BALANCING SOLUTION FOR CO-OPERATIVE BROADCASTING IN A WIRELESS COMMUNICATION SYSTEM

PRIORITY

This application claims priority of Finnish patent application number 20205077 which was filed on 27 Jan. 2020, the content of which is incorporated herein by reference.

TECHNICAL FIELD

The invention concerns in general the technical field of wireless communication systems. Especially the invention concerns broadcasting in wireless communication systems.

BACKGROUND

A wireless communication network, such as a wireless mesh network (WMN) or a cluster tree topology (e.g. as described in a patent publication U.S. Pat. No. 8,064,363 B2), is formed by multiple, possibly even hundreds or thousands or even more of radio devices that may communicate with each other, depending on e.g. transmission range, frequency channel usage, etc. The wireless communication network may have one or more sink devices that may be part of gateways to other networks, e.g. Internet, and deliver data to and from the wireless communication network. To support the various functions of the wireless communication networks, the radio devices typically operate in different roles. The radio devices of the network may be divided into router devices and non-router devices depending on if they participate in data forwarding, i.e. routing. Router devices maintain the connectivity of the network and forward, i.e. route, data of other radio devices when needed. Non-router devices may transmit their own data and receive data directed for them, but they do not route data of other radio devices. Wireless communication network may not be in static radio environment and part of the devices may move, appear or disappear.

One example of the wireless mesh network may be a wireless sensor network (WSN) formed by sensor devices that produce data. Each sensor device may be equipped with one or more radios that are used to deliver the data towards the sink device. Even if a single sensor radio cannot directly reach the sink device, the wireless mesh network formed between the sensor radio devices takes care of it. A routing protocol implemented in each radio device chooses the way to the sink device. Similarly, there may be data that is delivered, over multiple radio hops, from the sink device to the radio device(s) or in between radio devices.

The data transmitted in the wireless communication network may have tight timing requirements, i.e. low latency communication requirements from radio device to radio device or radio device to sink device delivery. As an example, in lighting system the switching control data should be delivered over the wireless mesh network quickly, e.g. within few hundreds of milliseconds to create better user experience.

The data delivery should be fast, but on the other hand should not cause jamming to the network. Broadcasting/flooding may be the fastest way to deliver data to multiple receivers, but it also may cause collisions and increase interference. In case of larger networks, a non-controlled burst of broadcast messages may fully block the channels and impact the delivery of other data. By repeating, by the router devices, the broadcast message, the data may be distributed to the radio devices in the network.

In broadcast communication, the trade-off between reliability and communication overhead may be controlled with different amount of repetitions of the broadcast messages. In typical broadcast/flooding communication protocols, the amount of repetitions is message-specific and is typically the same for every device. This means, that in dense installations, the total amount of repetitions may be excessive and cause a large overhead resulting in e.g. large amount of collisions and interference. On the other hand, in sparse installation, the amount of repetitions may be too low to achieve sufficient reliability. Both of the outcomes may result in reduced quality of service, e.g. lost data and/or increased delays.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a wireless communication system, a method for a wireless communication system, a radio device for a wireless communication system, a method for the radio device, a computer program and tangible non-volatile computer readable medium for co-operative broadcasting. Another objective of the invention is that the system, the methods, the computer program and the tangible non-volatile computer readable medium for co-operative broadcasting improve the performance of the wireless communication network.

The objectives of the invention are reached by a method, an apparatus and a computer program as defined by the respective independent claims.

According to a first aspect, a wireless communication system comprising a plurality of radio devices is provided, wherein each radio device belongs to one or more radio neighborhoods and is capable of repeating the transmission of the broadcast message regardless of whether the radio device is operating as a router device or as a non-router device, wherein radio devices belonging to each radio neighborhood are configured to repeat collectively a transmission of a broadcast message a collective target amount of repetitions within each radio neighborhood, wherein each radio device within each radio neighborhood to which it belongs is arranged to: define a total repetition load value representing a contribution of said radio device to the collective target amount of repetitions of the broadcast message within said radio neighborhood, and decide whether to repeat the transmission of the broadcast message in accordance with the defined total repetition load value.

Each radio device may be associated with at least one parent device.

Moreover, the total repetition load value may be defined based on own repetition load value of the radio device and a parent repetition load value of the radio device defined for each of the associated at least one parent device of the radio device.

The own repetition load value of the non-router device may be zero.

The own repetition load value of the router device may depend on the number of router devices within the radio neighborhood and the number of member devices of said router device, wherein the parent repetition load value of the radio device may depend on the number of router devices within the radio neighborhood and the number of member devices of the associated parent device.

Alternatively, the own repetition load value of the router device having one or more non-router member devices may be zero, and the own repetition load value of the router device without non-router member devices may depend on the number of router devices within the radio neighborhood and the number of member devices of said radio device.

Moreover, the parent repetition load value of the router device may depend on the number of router devices within the radio neighborhood and the number of member devices of the associated parent device, and the parent repetition bad value of the non-router device may depend on the number of router devices within the radio neighborhood and the number of non-router member devices of the associated parent device.

Only part of the non-router devices may be arranged to participate the repetition of the transmission of the broadcast message, wherein the own repetition load value of the radio device and/or the parent repetition load value of the radio device may further depend on the number of participating non-router devices.

Each router device may be arranged to: define the number of its member devices and the number of its non-router member devices, and transmit regularly beacon messages, wherein each beacon message may include the current number of member devices and the current number of the non-router member devices of the router device.

Each router device may be arranged to detect the number of router devices within the radio neighborhood by receiving beacon messages transmitted by other router devices of the radio neighborhood.

According to a second aspect, a method for a wireless communication system comprising a plurality of radio devices is provided, wherein each radio device belongs to one or more radio neighborhoods and is capable of repeating the transmission of the broadcast message regardless of whether the radio device is operating as a router device or as a non-router device, wherein radio devices belonging to each radio neighborhood are configured to repeat collectively a transmission of a broadcast message a collective target amount of repetitions within each radio neighborhood, wherein the method comprises: defining, by each radio device within each radio neighborhood to which it belongs, a total repetition load value representing a contribution of said radio device to the collective target amount of repetitions of the broadcast message within said radio neighborhood, deciding, by each radio device within each radio neighborhood to which it belongs, whether to repeat the transmission of the broadcast message in accordance with the defined total repetition load value.

According to a third aspect, a radio device for a wireless communication system is provided, wherein the radio device belongs to one or more radio neighborhoods and is capable of repeating a transmission of a broadcast message regardless of whether the radio device is operating as a router device or as a non-router device, wherein the radio device comprises: a processing part, and a data transfer part for providing a bi-directional radio communication with at least one other radio device of the system, wherein the radio device is configured to: define, by the processing part, a total repetition load value representing a contribution of the radio device to a collective target amount of repetitions of a broadcast message within each radio neighborhood; and decide, by the processing part, whether to repeat the transmission of the broadcast message in accordance with the defined total repetition load value.

According to a fourth aspect, a method for the radio device described above within a wireless communication system is provided, the method comprises: defining, by the processing part, a total repetition load value representing a contribution of the radio device to a collective target amount of repetitions of a broadcast message within each radio neighborhood; and deciding, by the processing part, whether to repeat the transmission of the broadcast message in accordance with the defined total repetition load value.

According to a fifth aspect, a computer program is provided, wherein the computer program comprises instructions which, when the program is executed by the radio device described above, cause the radio device to carry out at least the steps of the method for the radio device described above.

According to a sixth aspect, a tangible non-volatile computer readable medium comprising the computer program described above is provided.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
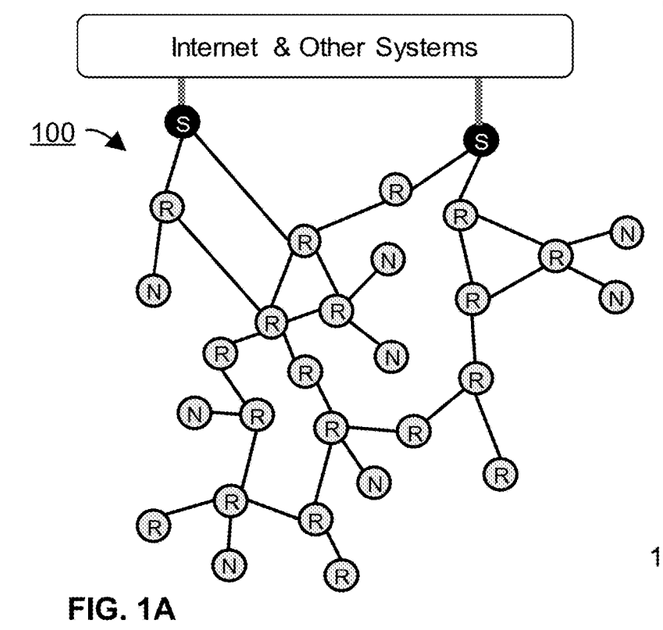
FIG. 1A illustrates schematically an example of a wireless communication system according to the invention.

FIG. 1A illustrates schematically an example of a wireless communication system, i.e. network, 100 according to the invention. The wireless communication system 100 may have a cluster tree network topology as illustrated in the example of FIG. 1A, The wireless communication system 100 according to the invention may also have any other network topology, e.g. the wireless communication system may be a wireless mesh network (WMN), such as a wireless sensor network (WSN).

Figure 1B:
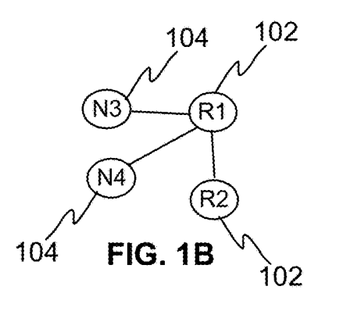
FIG. 1B illustrates schematically an example of a router device having member devices.

The wireless communication system 100 according to the invention may comprise a plurality of radio devices 102, 104 having different operating roles, such as router role 102 and/or non-router role 104. The router devices 102 of the system 100 form a skeleton for the network 100, where the router devices 102 may have one or more member devices. The member devices of the router device 102 may comprise one or more other router devices 102 and/or one or more non-router devices 104. FIG. 1B illustrates an example of a router device R1 having three member devices: non-router member devices N3 and N4 and a router member device R2. The router device R1 with its member devices may be a part of a wireless system 100. The system 100 according to the invention may further comprise one or more radio devices operating in a sink role 106. The sink devices 106 are part of gateway to other networks, e.g. Internet, and deliver data in and from the system 100. Each radio device 102, 104 of the system 100 may be associated with at least one parent device in their direct radio neighborhood, i.e, direct radio range. Preferably, each radio device 102, 104 of the system 100 may be associated with one parent device at a time. This may be preferable especially in dense wireless communication networks. However, each radio device 102, 104 may also be associated with more than one parent device. The parent device of each radio device 102, 104 may be a router device 102. Alternatively, if the wireless communication network comprises one or more sink devices 106, the parent device of each radio device 102, 104 may be a router device 102 or a sink device 106. In the example of FIG. 1B the router device R1 is the parent device for the router device R2 and for the non-router devices N3 and N4.

The term "radio neighborhood of a radio device" mean throughout this application one or more radio devices whose radio transmissions may be detected by a receiving radio device. An extended meaning of the term "radio neighborhood of a radio device" takes into account the neighbor(s) of the neighbor(s) of the radio device, i.e. multi-hop neighborhood, such as two-hop neighborhood, three-hop neighborhood, four-hop neighborhood, and/or so on. The wireless communication system 100 may be such that all radio devices 102, 104 cannot communicate directly with the one or more sink devices 106 due to extensive distance between radio devices 102, 104 and the one or more sink devices 106, and limited radio range, whereupon it is needed a multi-link, i.e. a multi-hop, communication between the radio devices 102, 104, and the one or more sink devices 106.

One way to provide the multi-hop communication in the wireless communication system 100 is broadcasting and repeating (re-broadcasting) data inside the system 100. The broadcasting may also be called as flooding. The broadcasted data may comprise for example one or more broadcast messages. The radio devices may be disallowed to repeat the broadcasted data multiple times, i.e, the repeating radio device 102, 104 is not allowed to repeat the transmission of the same data again, if it appears again later. For example, the data may include a unique identifier (ID) to identify the data and if a radio device 102, 104 receives data having ID that the radio device 102, 104 has already repeated, the radio device 102, 104 is not allowed to repeat said data again. For example, the ID may comprise of the original sender address and a sequence number. In addition or alternatively, the broadcasted data may include a hop limit to limit the scope of the broadcasted data. For example, the sender may set the hop limit for the broadcasted data, and each radio device 102, 104 repeating the data may decrement the hop limit value. When the radio device 102, 104 receives data with hop limit value of zero, it will not repeat the data.

The term broadcast refers to a communication method not destination addressing. By broadcasting and repeating the data may be distributed to the radio devices 102, 104 of the system 100. The radio devices 102, 104 that the data may actually be targeted to may be identified by separate addressing. The separate addressing may include for example broadcast addressing, where the data may be destined to all the radio devices 102, 104 of the system 100, multicast addressing, where the data may be destined to a group of radio devices 102, 104 of the system 100, or unicast addressing where the data may be destined to a single radio device 102, 104 of the system 100.

Figure 2:
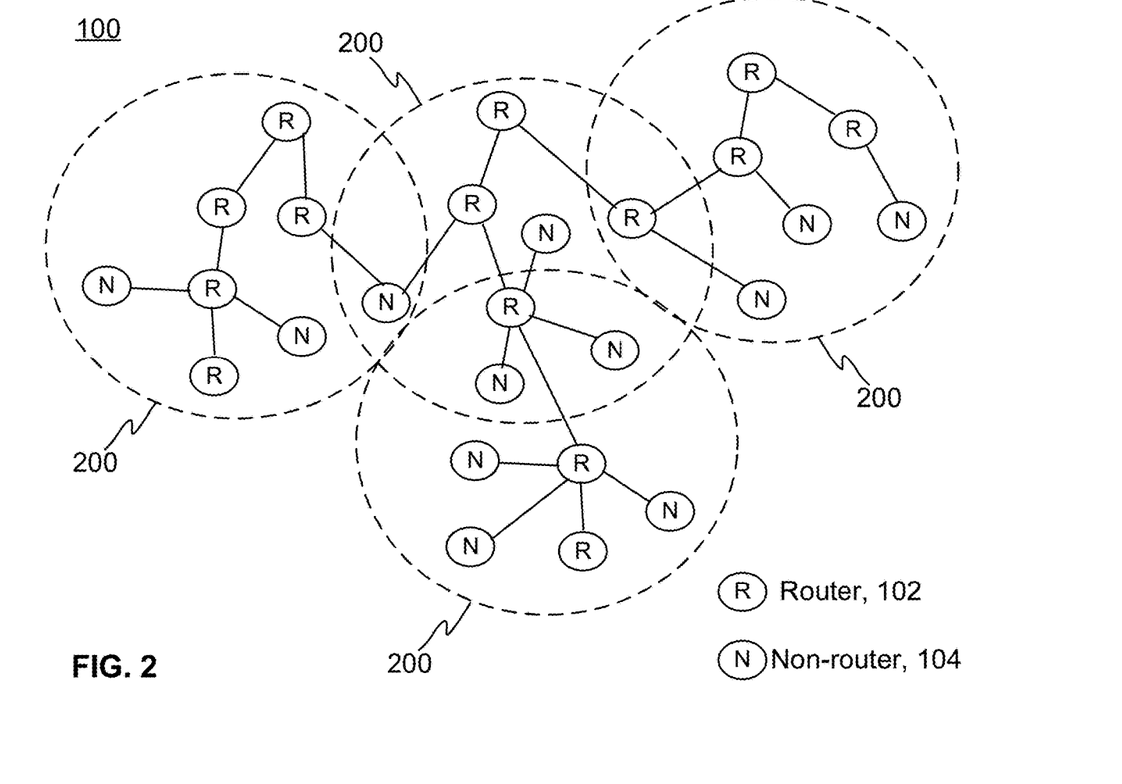
FIG. 2 illustrates schematically another example of a wireless communication system according to the invention.

FIG. 2 schematically illustrates an example of the wireless communication system 100 comprising a plurality of radio devices 102, 104 each belonging to one or more radio neighborhood, i.e. radio range 200. In the example of FIG. 2 the one or more radio neighborhoods 200 are overlapping, i.e. each radio neighborhood 200 comprises one or more radio devices 102 belonging to one or more other radio neighborhoods 200. The transmission of broadcast messages of the radio devices 102, 104 belonging to more than one radio neighborhood 200 may be heard, i.e. received, inside more than one radio neighborhood 200 enabling multi-hop communication. The example wireless communication system 100 of FIG. 2 comprises only router devices 102 and non-router devices 104, but the wireless communication system 100 may further comprise one or more sink devices 106 each belonging to one or more radio neighborhood 200.

Typically, in known wireless communication networks only the router devices 102 participate in forwarding, i.e. routing, of the broadcast messages and the non-router devices 104 may transmit their own data and receive data directed for them, but the non-router devices 104 do not participate in routing the broadcast messages. For example, in many practical multi-hop networks, e.g. lighting control networks, there may be plenty of mains powered non-router devices 104 that are not participating in the routing activities. However, each radio device 102, 104 of the wireless communication system 100 according to the present invention is capable of repeating a transmission of a broadcast message that is aimed to be delivered in the system 100 regardless of whether the radio device 102, 104 is operating as a router device 102 or as a non-router device 104. In other words, each radio device 102, 104 of the plurality of radio devices of the wireless communication system 100 according to the invention may participate in routing of a broadcast message that is aimed to be delivered in the system 100. This enables that the possible other resources of the wireless communication system 100 may be taken into use to reduce the duty from the router devices 102, which improves the data routing performance of the system 100, its latency and throughput that is primarily dependent on the router devices 102. The one or more sink devices 106 do not participate the repetition of the transmission of the broadcast message.

In order to distribute a broadcast message inside the wireless communication system 100 according to the invention, the radio devices 102, 104 belonging to each radio neighborhood 200 are configured to repeat collectively, i.e. cooperatively, a transmission of a broadcast message a collective target amount of repetitions within each radio neighborhood 200. The collective target amount of repetitions of the transmission of the broadcast message within each neighborhood may be e.g. a predefined amount, defined during the run-time of the method, or set by the application, wherein the wireless communication system 100 may be implemented. The target is to locally, i.e. within each radio neighborhood 200, provide the collective target amount of repetitions of the transmission of the broadcast message independent of the local number of router devices 102 and non-router devices 104, i.e. the number of router devices 102 and the number of non-router devices 104 within each radio neighborhood 200, i.e. radio range. In other words, the target is to keep the local collective target amount of repetitions of the transmission of the broadcast message the same inside each radio neighborhood 200 independent of the amount of router devices 102 inside each radio neighborhood. In other words, the more router devices 102 are within each radio neighborhood 200, the less repetitions of the transmission of the broadcast message are needed per router device 102. Each router device 102 may detect a router count (R), i.e. the number of router devices 102, within each radio neighborhood 200 to which the router device 102 belongs by scanning transmissions, e.g. beacon messages, within the radio neighborhood 200. Similarly, each non-router device 104 may detect the router count (R), i.e. the number of router devices 102 within the radio neighborhood 200, by scanning transmissions, e.g. beacon messages, within each radio neighborhood 200 to which the non-router device 104 belongs. In other words, each router device 102 and each non-router device 104 may be arranged to detect the number of router devices 102 within its radio neighborhood 200 by receiving beacon messages transmitted by other router devices 102 within the radio neighborhood 200.

Figure 3:
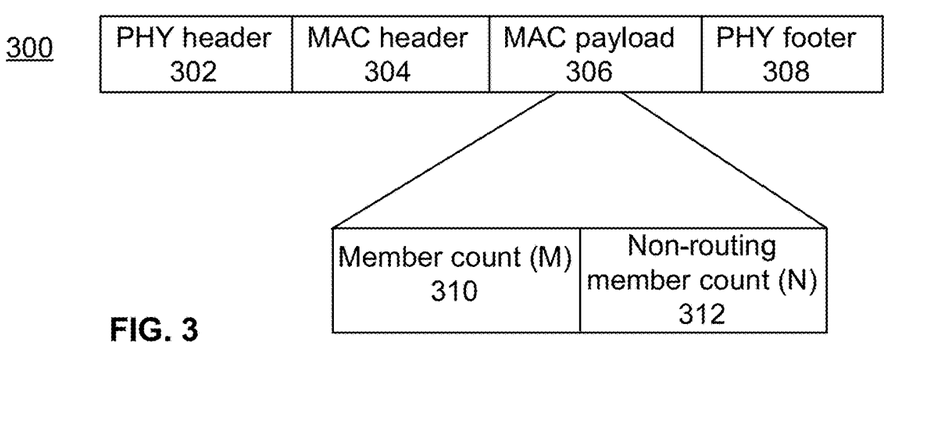
FIG. 3 illustrates schematically an example structure of a beacon frame according to the invention.

Furthermore, each router device 102 may define, e.g. keep track of, the number of its member devices, i.e. member count, (M) and the number of its non-router member devices, i.e. non-router member count, (N). Moreover, each router device 102 may report the member count (M) and the non-router member count (N) to the members or said router device 102. The reporting may for example be implemented as a part of regularly distributed, i.e. transmitted, beacon messages, i.e. beacon frames 300. Each transmitted beacon message transmitted by the router device 102 may include the number of the member devices (M) of the router device 102 and the number of the non-router member devices (N) of the router device 102. FIG. 3 illustrates an example structure of a beacon frame 300 including the number of the member devices (M) and the number of the non-router member devices (N). The number of the member devices (M) field 310 and the number of the non-router member devices (N) field 312 may be included in a medium access control layer (MAC) payload field 306 of the beacon frame 300. The beacon frame may further comprise e.g. physical layer (PHY) header field 302, MAC header field 304, and PHY footer field 308.

Figure 4:
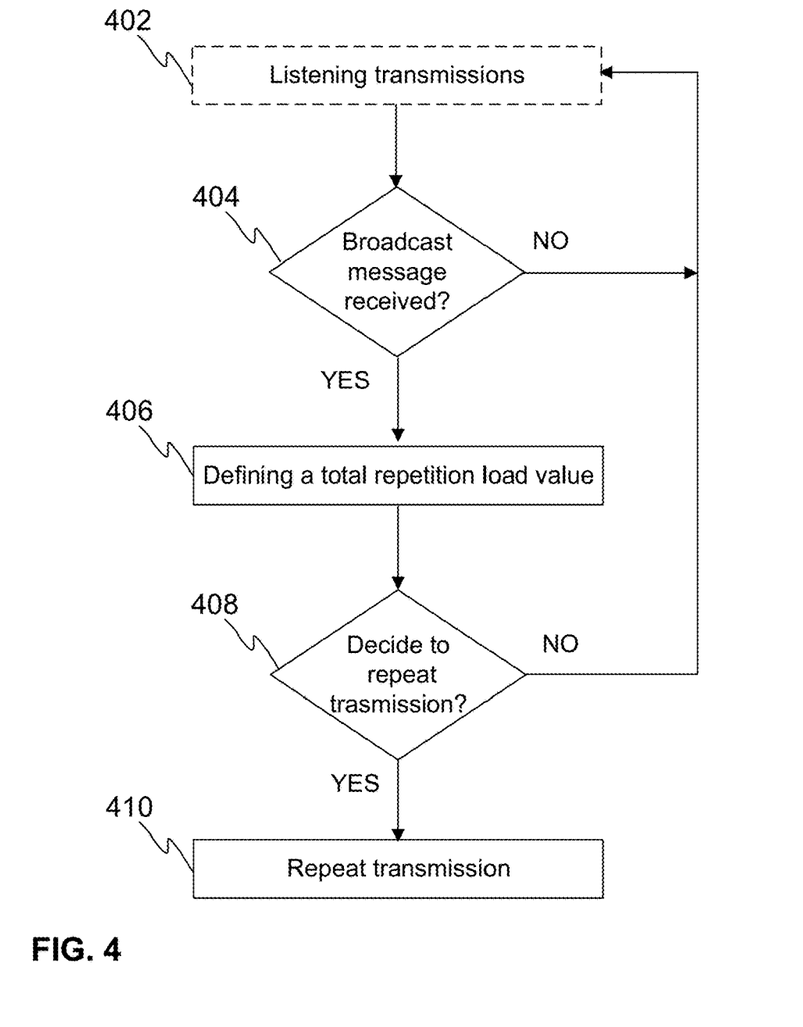
FIG. 4 illustrates schematically an example of a method according to the invention.

A load balanced collective broadcast method according to the invention is described next referring to FIG. 4, which schematically illustrates an example of the invention as a flow chart. The method is described by referring to one radio device 102, 104 within one radio neighborhood 200 to which said one radio device 102, 104 belongs. However, each radio device 102, 104 of the system 100 that receives a broadcast message inside the radio neighborhood 200 may independently perform the method steps. In other words, each radio device 102, 104 that receives a broadcast message may be configured to independently decide whether to repeat the transmission of the received broadcast message or not and the amount of repetitions of the transmission of the broadcast message by performing at least some of the steps of the method according to the invention. Moreover, each radio device 102, 104 may independently perform the method steps within each radio neighborhood 200 to which each radio device 102, 104 belongs.

The radio device 102, 104 may listen, i.e. scan, transmissions within the radio neighborhood 200 at a step 402 in order to receive the broadcast message at a step 404. If the radio device 102, 104 detects at a step 404 that it does not receive any broadcast messages it continues listening transmissions at the step 402.

At a step 406 the radio device 102, 104 defines a total repetition load value, after receiving the broadcast message. The total repetition load value represents the contribution of said radio device 102, 104 to the collective target amount of repetitions of the broadcast message within the radio neighborhood 200, The total repetition load value may be defined based on an own repetition load value of the radio device 102, 104 and a parent repetition load value of the radio device 102, 104 defined for each of the at least one associated parent device of the radio device 102, 104 as will be described later by referring different examples.

At a step 408 the radio device 102, 104 decides whether to repeat the transmission of the broadcast message in accordance with the defined total repetition load value, i.e. based on the defined total repetition load value. The total repetition load value defines a probability with which the radio device 102, 104 repeats the transmission the broadcast message and the amount of repetitions so that the collective target amount is achieved. In other words, the radio device 102, 104 decides based on the defined total repetition load value whether it repeats the broadcast message and how many times it repeats the broadcast message. The amount of repetitions of individual radio device 102, 104 may differ from 0 to n, wherein n>0, in order to achieve the collective target amount of repetitions inside the radio neighborhood.

The repetition of the broadcast message may be performed on one or more frequency channels. The one or more frequency channels may for example be pre-defined or defined during the run-time of the method by the radio device 102, 104. The collective target amount of repetitions of the broadcast message may be the same or different for each of the one or more frequency channels. Alternatively or in addition, the collective target amount of repetitions of the broadcast message and/or the one or more frequency channels may be the same or different for each radio neighborhood 200.

As described above the total repetition load value (TRL) may be defined based on the own repetition load value (ORL) of the radio device 102, 104 and the parent repetition load value (PRL) of the radio device 102, 104 defined for each of the associated at least one parent device of the radio device 102, 104. For example, the total repetition load value may be defined to be the sum of the own repetition load value of the radio device 102, 104 and the parent repetition load value(s) of the radio device 102, 104 defined for each of the associated at least one parent device. If the radio device 102, 104 is associated with more than one parent device, the parent repetition load value (PRL) of the radio device 102, 104 is defined for each parent device of the radio device 102, 104 and the total repetition load value (TRL) may be defined to be the sum of the own repetition load value (ORL) of the radio device 102, 104 and the parent repetition load values (PRLs) of the radio device 102, 104 defined for each parent device of the radio device 102, 104. Alternatively, if the radio device 102, 104 is associated with one parent device, the parent repetition load value (PRL) of the radio device 102, 104 is defined for said one parent device of the radio device 102, 104 and the total repetition load value (TRL) may be defined to be the sum of the own repetition load value (ORL) of the radio device 102, 104 and the parent repetition load value (PRL) of the radio device 102, 104 defined for said one parent device.

As discussed above, the sink devices 106 do not repeat the transmission of the broadcast message. Thus, the own repetition load value (ORL) of the sink device 106 is zero and the parent repetition load value (PRL) of the sink device 106 is zero causing that the total repetition load value (TRL) of the sink device 106 is zero. Moreover, if a sink device 106 is the parent of the radio device 102, 104, the parent repetition load value (PRL) of the radio device 102, 104 defined for the sink device 106 is zero, because the sink devices 106 do not repeat the transmission of the broadcast message.

Next some examples for defining the own repetition load value (ORL) of the radio device 102, 104 and the parent repetition load value (PRL) of the radio device 102, 104 are described.

According to a first example, the broadcast message repetition load may be divided between the router devices 102 and the non-router device 104 within the radio neighborhood 200 by applying distributed decision making. The own repetition load value may be defined to be zero for the non-router devices 104. Moreover, the own repetition load of the router device 102 may depend on the number of router devices 102 within the radio neighborhood 200 and the number of member devices of said router device 102. The own repetition load value (ORL) of the router device 102 may be defined for example according to the following formula:

$$ORL=1/(R\times(M+1)), \quad (1)$$

wherein R is number of router devices 102 within the radio neighborhood 200, i.e. router count, and M is the number of the member devices of said router device 102, 104, i.e. the member count of said router device 102.

The parent repetition load value (PRL) of the radio device 102, 104 may depend on the number of router devices within the radio neighborhood 200 and the number of member devices of the associated parent device of the radio device 102, 104 irrespective whether the radio device 102, 104 is operating as a router device 102 or as a non-router device 104, The parent repetition load value of the radio device 102, 104 may be defined for example according to the following formula:

$$PRL==1/(R\times(M_P+1)), \quad (2)$$

wherein R is number of router devices 102 within the radio neighborhood, i.e. router count, and $M_P$ is the number of the member devices of the associated parent device, i.e. the member count of the associated parent device. As discussed above, if the radio device 102, 104 has more than one parent device, the parent repetition load value (PRL) may be defined separately for each associated parent device of the radio device 102, 104 with the above formula (2).

According to a second example, the broadcast message repetition load may be divided between the router devices 102 and the non-router device 104 within the radio neighborhood 200 by applying non-equal load balanced decision making. In this example the broadcast message repetition load may be moved from the router devices 102 to their non-router device 104 members, if the router device 102 has one or more non-router device members 104.

Also, in this example the own repetition load value (ORL) may be defined to be zero for the non-router devices 104. The own repetition load value (ORL) of the router devices 102 depends on whether the router device 102 has one or more non-router member devices 104. The own repetition load value may be defined to be zero for the router devices 102 having one or more non-router members devices 104. The own repetition load value of the router device 102 without non-router member devices 104 may depend on the number of router devices 102 within the radio neighborhood 200 and the number of member devices of said radio device 102, 104. The own repetition load value (ORL) of the router devices 102 without non-router member devices 104 may be defined for example according to the same formula (1) as in the first example described above.

In this second example, the parent repetition load value (PRL) may be defined differently for the router devices 102 than for the non-router devices 104. The parent repetition load value (PRL) of the non-router device 104 may depend on the number of router devices 102 within the radio neighborhood and the number of non-router member devices 104 of the associated parent device. The parent repetition load value of the non-router device 104 may be defined for example according to the following formula:

$$PRL=1/(R\times N_P), \quad (3)$$

wherein R is number of router devices 102 within the radio neighborhood, i.e. router count, and $N_P$ is the number of the non-router member devices 104 of the associated parent device, i.e. the non-router member count of the associated parent device. As discussed above, if the non-router device 104 has more than one parent device, the parent repetition load value (PRL) may be defined separately for each associated parent device of the non-router device 104 with the above formula (3).

The parent repetition bad value (PRL) of the router devices 102 may depend on the number of router devices within the radio neighborhood 200 and the number of member devices of the associated parent device of the router device 102. The parent repetition bad value (PRL) of the router device 102 may be defined according to the same formula (2) as in the first example described above. However, if the parent device of the router device 102 has one or more non-router member devices 104, the parent repetition bad value (PRL) of the router devices 102 is zero.

Figure 5A:
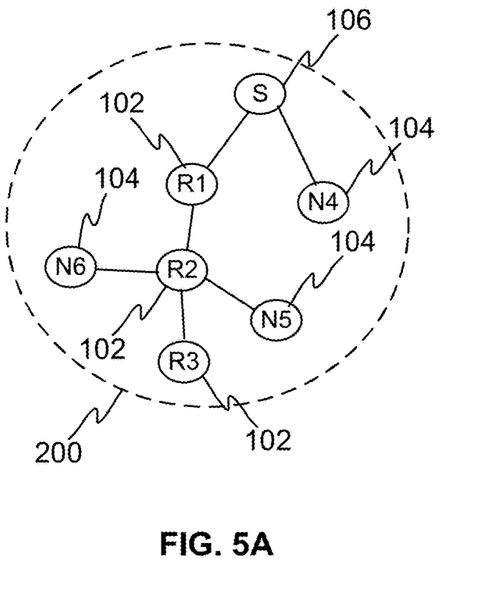
FIGS. 5A and 5B illustrate schematically example network topologies.
Figure 5B:
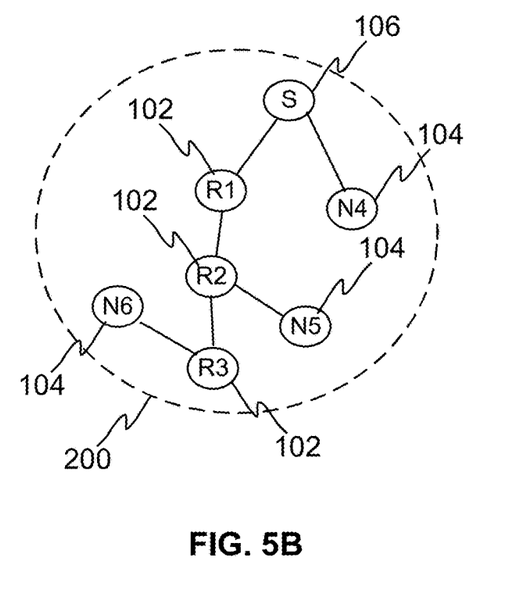

FIGS. 5A and 5B illustrate example network topologies comprising one sink device S, 106, three router devices R1-R3, 102 and three non-router devices N4-N6, 104. Each radio device 102, 104 of the example network topologies of FIGS. 5A and 5B belong to one radio neighborhood 200. The example network topologies of FIGS. 5A and 5B differ slightly from each other. In the example network topology of FIG. 5A the router device R2 has three members: router device R3, non-router device N5 and non-router device N6, and the router device R3 does not have any members. In the example network topology of FIG. 5B the router device R2 has two members: router device R3 and non-router device N5, and the router device R3 has one member that is non-router device N6.

As discussed above each radio device 102, 104 of the example network topologies of FIGS. 5A and 5B defines independently its total repetition load value and decides independently whether to repeat the transmission of the broadcast message in accordance with the defined total repetition load value. To define the total repetition load value each radio device 102, 104 may define its own repetition load value and its parent repetition load value of radio device 102, 104 defined for each of the at least one parent device. In the example network topologies of FIGS. 5A and 5B each radio device 102, 104 is associated with one parent device.

Thus, the total repetition load value (TRL) of each radio device 102, 104 is the sum of the its own repetition load value (ORL) and its parent repetition load value (PRL) defined for said one parent device, Table 1 presents load values (ORL, PRL and TRL) for each radio device 102, 104 of the example network topology of FIG. 5A defined according to the first example discussed above. As can be seen from the defined total representation load values of the Table 1 the probability that the router device R3, which has no member devices, repeats the transmission of the broadcast message is 42%, whereas the probability that the non-router devices N5 and/or N6 repeat the transmission of the broadcast message is only 8%.

TABLE 1

The defined load values (ORL, PRL and TRL)
for each radio device of
the example network topology FIG. 5A for the first example.

| Radio device | ORL | PRL | TRL (%) | Comments |
|---|---|---|---|---|
| S | 0 | 0 | 0 | Does not repeat |
| R1 | 1/(3*2) | 0 | 17% | Has one member and parent is sink that does not repeat |
| R2 | 1/(3*4) | 1/(3*2) | 25% | Has three members |
| R3 | 1/3 | 1/(3*4) | 42% | No members |
| N4 | 0 | 0 | 0 | Parent is sink that does not repeat |
| N5 | 0 | 1/(3*4) | 8% | |
| N6 | 0 | 1/(3*4) | 8% | |
| SUM | | | 100% | |

Table 2, in turn, presents load values (ORL, PRL and TRL) for each radio device 102, 104 of the example network topology of FIG. 5B defined according to the first example discussed above. As can be seen from the defined total representation load values of the Table 2 the probability that the router device R3, which now has one member device, repeats the transmission of the broadcast message is now 28%, whereas the probability that the non-router devices N5 and N6 repeat the transmission of the broadcast message is 11% and 17%, respectively. Thus, the probability that the non-router devices N5 and N6 participate in the routing, i.e. repetition of the broadcast message, is higher in the example network topology of FIG. 5B than in the example network topology of FIG. 5A.

TABLE 2

The defined load values (ORL, PRL and TRL)
for each radio device of the
example network topology of FIG. 5B for the first example.

| Radio device | ORL | PRL | TRL (%) | Comments |
|---|---|---|---|---|
| S | 0 | 0 | 0 | Does not repeat |
| R1 | 1/(3*2) | 0 | 17% | Has one member and parent is sink that does not repeat |
| R2 | 1/(3*3) | 1/(3*2) | 28% | Has two members |
| R3 | 1/(3*2) | 1/(3*3) | 28% | Has one member |
| N4 | 0 | 0 | 0 | Parent is sink that does not repeat |
| N5 | 0 | 1/(3*3) | 11% | |
| N6 | 0 | 1/(3*2) | 17% | |
| SUM | | | 100% | |

Table 3, in turn, presents load values (ORL, PRL and TRL) for each radio device 102, 104 of the example network topology of FIG. 5A defined according the second example discussed above. As can be seen from the defined total representation load values of the Table 3 the probability that the router device R2, which has two non-router member devices N5 and N6 and one router member device, repeats the transmission of the broadcast message is now 17% and the probability that the non-router devices N5 and N6 repeat the transmission of the broadcast message is 17%. This means that broadcast repetition load of the router device R2 is moved partly to its non-router member devices N5 and N6, i.e. each of the non-router members N5 and N6 takes ½ of the load of the parent device. Moreover, the broadcast repetition load of the router device R3, which has no member devices is also moved partly to the non-routing members N5 and N6 of the router device R2, which is the parent device of the router device R3. When comparing the results of the Table 3, in which the load values (ORL, PRL and TRL) of the example network topology of FIG. 5A are defined for the second example above, to the results of the Table 1, in which the load values (ORL, PRL and TRL) of the example network topology of FIG. 5A are defined according to the first example above, it may be seen the difference between the non-equal load balanced decision making (second example) and the distributed decision making (first example).

TABLE 3

The defined load values (ORL, PRL and TRL)
for each radio device of the
example network topology of FIG. 5A for the second example.

| Radio device | ORL | PRL | TRL (%) | Comments |
|---|---|---|---|---|
| S | 0 | 0 | 0 | Does not repeat |
| R1 | 1/(3*2) | 0 | 17% | Has one router member and parent is sink that does not repeat |
| R2 | 0 | 1/(3*2) | 17% | Has one router member and two non-router members |
| R3 | 1/3 | 0 | 33% | No members |
| N4 | 0 | 0 | 0 | Parent is sink that does not repeat |
| N5 | 0 | 1/(3*2) | 17% | |
| N6 | 0 | 1/(3*2) | 17% | |
| SUM | | | 100% | |

In the above presented examples all the radio devices 102, 104 of the system 100 may participate in the repetition of the transmission of the broadcast message, but the invention is not limited to that, According to an example embodiment of the invention only part of the non-router devices 104 may be arranged to participate the repetition of the transmission of the broadcast message. For example, at least part of the non-router devices 104 of the system 100 may be battery powered and should not preferably consume their energy resources for the repetition of the transmission of the broadcast messages. Thus, the own repetition load value (ORL) of the radio device 102, 104 and the parent repetition load value (PRL) of the radio device 102, 104 may further depend on the number of participating non-router member devices (QM), i.e. qualified non-router member devices 104. The router device 102 having one or more non-router member device 104 may inform all its member device about the number of the participating non-router member devices (QM).

The number of participating non-router member devices (QM) may be included in the definitions of the own repetition load value (ORL) of the radio device 102, 104 and the parent repetition load value (PRL) of the radio device 102, 104 according to the above presented examples.

For example, in the definition according to the first example, the own repetition load value (ORL) of the router device 102 may be defined for example instead of the formula (1) according to the following formula:

$$ORL=1/(R\times(QM+1)), \quad (4)$$

wherein R is number of router devices 102 within the radio neighborhood 200, i.e. router count, and QM is the number of the participating non-router member devices of said router device 102.

Alternatively or in addition, in the definition according to the first example, the parent repetition load value (PRL) of the radio device 102, 104 may be defined for example instead of the formula (2) according to the following formula:

$$PRL=1/(R\times(QM_P+1)), \quad (5)$$

wherein R is number of router devices 102 within the radio neighborhood 200, i.e. router count, and $QM_P$ is the number of the participating non-router member devices of the associated parent device.

Alternatively or in addition, in the definition according to the second example, the parent repetition load value (PRL) of the non-router device 104 may be defined for example instead of the formula (3) according to the following formula:

$$PRL=1/(R\times(N_P-(M_P-QM))), \quad (6)$$

wherein R is number of router devices 102 within the radio neighborhood, i.e. router count, and $N_P$ is the number of the non-router member devices 104 of the associated parent device, i.e. the non-router member count of the associated parent device, $M_P$ is the number of the member devices of the associated parent device, i.e. the member count of the associated parent device, and $QM_P$ is the number of the participating non-router member devices of the associated parent device.

Above, only non-limiting examples for definition of the own repetition load value (ORL) of the radio device 102, 104 and the parent repetition load value (PRL) of the radio device 102, 104 are disclosed. The invention is not limited to the above present examples and the own repetition load value (ORL) of the radio device 102, 104 and/or the parent repetition load value (PRL) of the radio device 102, 104 may be defined in any other way. The above presented examples disclose simple ways to define the own repetition load value (ORL) of the radio device 102, 104 and the parent repetition load value (PRL) of the radio device 102, 104 which decreases the needed processing capacity.

Figure 6:
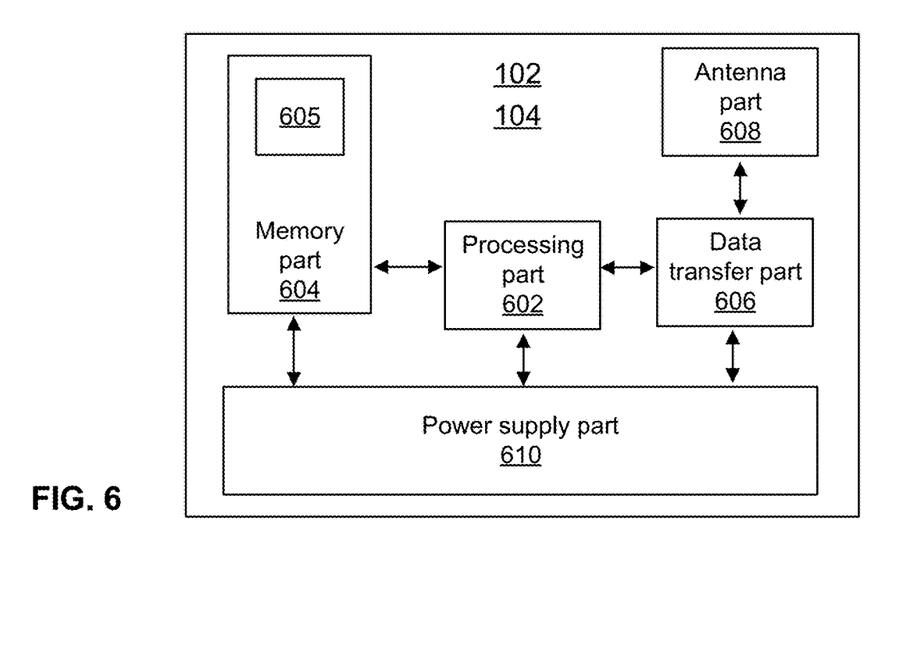
FIG. 6 illustrates an example of a radio device according to the invention.

FIG. 6 illustrates an example of a radio device (apparatus) 102, 104 according to the invention. The radio device 102, 104 comprises a processing part 602 that is configured to perform user and/or computer program (software) initiated instructions, and to process data in order to run an application and communication protocol. The processing part 602 may comprise at least one processor, e.g. one, two, or three processors. The radio device 102, 104 further comprises a memory part 604 in order to store and to maintain data. The data may be instructions, computer programs, and data files. The memory part 604 may comprise at least one memory, e.g. one, two, or three memories.

The radio device 102, 104 further comprises a data transfer part 606 and an antenna part 608 for providing a bi-directional radio communication with at least one other radio device 102, 104. The radio device 102, 104 may use the data transfer part 606 in order to transmit commands, requests, messages, and data to at least one of other radio devices 102, 104, 106 of the wireless communication system 100 via the antenna part 608. The data transfer part 606 also receives commands, requests, messages, and data from at least one of the other radio devices 102, 104, 106 via the antenna part 608 in the wireless communication system 100. The radio device 102, 104 may further comprise a power supply part 610. The power supply part 610 comprises components for powering the radio 102, 104, e.g. a battery and a regulator.

The memory part 602 comprises a data transfer application for operating, i.e. controlling, the data transfer part 606, an antenna application for operating the antenna part 608, and a power supply application for operating the power supply part 610.

The memory part 604 comprises also load balancing application 605, i.e. a computer program, comprising instructions which, is configured to use at least one of parts 606, 608, 610 in order to perform, i.e. carry out, at least the operations, i.e. the method steps, of the radio device 102, 104 described above in this description part and figures, when it is run, i.e. executed, by a computer, e.g. by the radio device 102, 104 by means of the processing part 602.

The computer program may be stored in a tangible non-volatile computer readable medium, e.g. an USB stick or a CD-ROM disc.

The method, the wireless communication system 100, and the radio device 102, 104 according to the invention described above improves the performance of the wireless communication network 100 by distributing, i.e. offloading, broadcasting duties also to "idle" radio devices, i.e. radio devices that do not typically participate in broadcasting, e.g. non-router devices 104. The invention enables simple way for each radio device 102, 104 to define themselves the amount of offloading they are supposed to do with minimal negotiations, i.e. the radio devices do no need to send separate messages to request the information needed to define the need to repeat the transmission of the broadcast message. Moreover, the invention described above enables that a broadcast message may be delivered within the wireless communication system 100 by decreasing the amount of unnecessary traffic and collisions in the wireless communication system 100.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. A wireless communication system comprising a plurality of radio devices, each radio device belongs to one or more radio neighborhoods and is capable of repeating the transmission of the broadcast message regardless of whether the radio device is operating as a router device or as a non-router device, wherein radio devices belonging to each radio neighborhood are configured to repeat collectively a transmission of a broadcast message a collective target amount of repetitions within each radio neighborhood, wherein each radio device within each radio neighborhood to which it belongs is arranged to:

define a total repetition load value representing a contribution of said radio device to the collective target amount of repetitions of the broadcast message within said radio neighborhood, and decide whether to repeat the transmission of the broadcast message in accordance with the defined total repetition load value.

2. The system according to claim 1, wherein each radio device is associated with at least one parent device.

3. The system according to claim 2, wherein the total repetition load value is defined based on an own repetition load value of the radio device and a parent repetition load value of the radio device defined for each of the associated at least one parent device of the radio device.

4. The system according to claim 3, wherein the own repetition load value of the non-router device is zero.

5. The system according to claim 3, wherein the own repetition load value of the router device depends on the number of router devices within the radio neighborhood and the number of member devices of said router device, wherein the parent repetition load value of the radio device depends on the number of router devices within the radio neighborhood and the number of member devices of the associated parent device.

6. The system according to claim 3, wherein the own repetition load value of the router device having one or more non-router member devices is zero, and wherein the own repetition load value of the router device without non-router member devices depends on the number of router devices within the radio neighborhood and the number of member devices of said radio device.

7. The system (according to claim 6, wherein the parent repetition load value of the router device depends on the number of router devices within the radio neighborhood and the number of member devices of the associated parent device, and wherein the parent repetition load value of the non-router device depends on the number of router devices within the radio neighborhood and the number of non-router member devices of the associated parent device.

8. The system according to claim 3, wherein only part of the non-router devices are arranged to participate the repetition of the transmission of the broadcast message; wherein the own repetition load value of the radio device and/or the parent repetition load value of the radio device further depend on the number of participating non-router devices.

9. The system according to claim 1, wherein each router device is arranged to:
define the number of its member devices and the number of its non-router member devices, and
transmit regularly beacon messages, wherein each beacon message includes the current number of member devices and the current number of the non-router member devices of the router device.

10. The system according to claim 1, wherein each router device is arranged to detect the number of router devices within the radio neighborhood by receiving beacon messages transmitted by other router devices of the radio neighborhood.

11. A method for a wireless communication system comprising a plurality of radio devices, each radio device belongs to one or more radio neighborhoods and is capable of repeating the transmission of the broadcast message regardless of whether the radio device is operating as a router device or as a non-router device, wherein radio devices belonging to each radio neighborhood are configured to repeat collectively a transmission of a broadcast message a collective target amount of repetitions within each radio neighborhood, wherein the method comprises:
defining, by each radio device within each radio neighborhood to which it belongs, a total repetition load value representing a contribution of said radio device to the collective target amount of repetitions of the broadcast message within said radio neighborhood; and
deciding, by each radio device within each radio neighborhood to which it belongs, whether to repeat the transmission of the broadcast message in accordance with the defined total repetition load value.

12. A radio device for a wireless communication system, wherein the radio device belongs to one or more radio neighborhoods and is capable of repeating a transmission of a broadcast message regardless of whether the radio device is operating as a router device or as a non-router device, wherein the radio device comprises:
a processing part, and
a data transfer part for providing a bi-directional radio communication with at least one other radio device of the system,
wherein the radio device is configured to:
define, by the processing part, a total repetition load value representing a contribution of the radio device to a collective target amount of repetitions of a broadcast message within each radio neighborhood; and
decide, by the processing part, whether to repeat the transmission of the broadcast message in accordance with the defined total repetition load value.

13. A method for the radio device according to claim 12 within a wireless communication system, the method comprises:
defining, by the processing part, a total repetition load value representing a contribution of the radio device to a collective target amount of repetitions of a broadcast message within each radio neighborhood; and
deciding, by the processing part, whether to repeat the transmission of the broadcast message in accordance with the defined total repetition load value.

14. A computer program comprising instructions which, when the program is executed by the radio device according to claim 12, cause the radio device to carry out at least the steps of the method according to claim 13.

15. A tangible non-volatile computer readable medium comprising the computer program according to claim 14.

* * * * *